Patented Dec. 26, 1922.

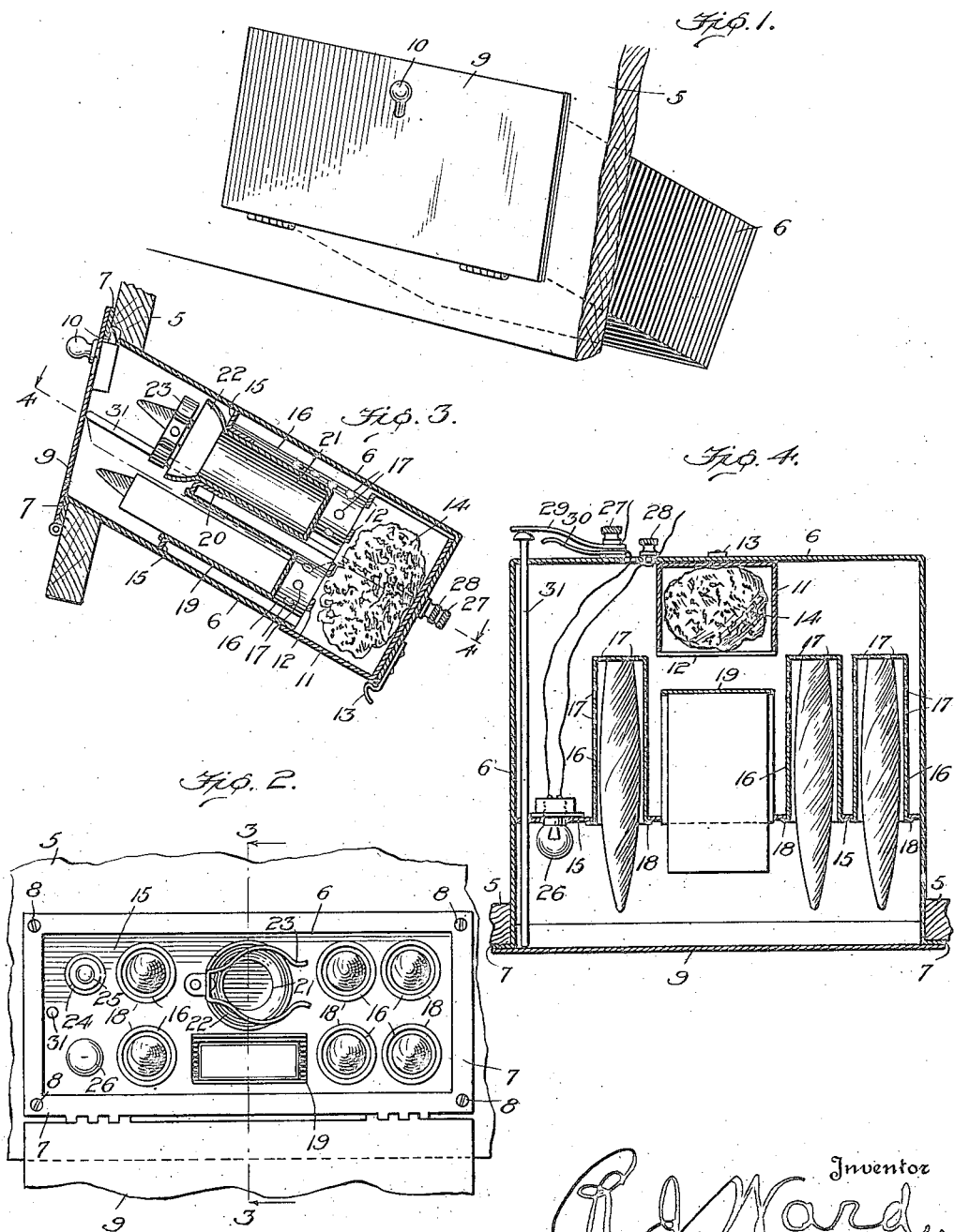

1,440,255

UNITED STATES PATENT OFFICE.

ROBERT J. WARD, OF CUTHBERT, GEORGIA.

SMOKER'S CABINET FOR AUTOMOBILES.

Application filed September 14, 1922. Serial No. 588,241.

*To all whom it may concern:*

Be it known that I, ROBERT J. WARD, a citizen of the United States, residing at Cuthbert, in the county of Randolph and State of Georgia, have invented certain new and useful Improvements in Smokers' Cabinets for Automobiles; and I do hereby declare the following to be a full, clear, and exact description of the invention, such as will enable others skilled in the art to which it appertains to make and use the same.

My invention relates to special receptacles in the form of package and article carriers for vehicles, but more particularly stated relates to an automobile accessory comprising a box or closure secured to the switchboard or instrument board of the vehicle, and provided with convenient compartments for containing smoking materials.

The invention has for an object primarily the equipment of automobiles with smoking cabinets within convenient reach of occupants of the vehicle.

It has for a further object the preservation of smoking materials in prime condition for use, also of providing cigar lighting means which is at all times readily accessible, as well as a receptacle for ashes which might otherwise fall upon the car floor or upholstery.

The smoker's cabinet forming the subject matter of this application for Letters Patent is adaptable to vehicles in general, including all types of automobiles, but is especially desirable and advantageous for use in connection with closed cars, in which the windows are usually kept closed in inclement or cold weather, thus rendering the disposition of cigar ashes a matter of considerable inconvenience in the absence of provisions to the contrary.

With the foregoing and other objects in view, the present invention will be hereinafter particularly described and then pointed out by the claims following such description.

In the accompanying drawings which form part of this application, and whereon corresponding numerals indicate like parts in the several views:

Figure 1 is a perspective view of my invention, including a fragmentary view of an instrument board to which it is attached;

Figure 2 is a plan view of the smoking cabinet open, looking directly into its interior;

Figure 3 is a transverse, central, vertical, sectional view, taken on the line 3—3 of Figure 2; and Figure 4 is also a section taken at right angles to that of Figure 3, being on the line 4—4 of said Figure 3.

Reference being had to the drawings and designating characters thereon, the numeral 5 indicates an ordinary automobile instrument-board upon which the ignition switch, light switch, speedometer, oil and electric gages, etc., are affixed. In applying my invention, an opening of suitable shape and dimensions is first made through the board 5, and through this opening is introduced the outer casing or body of cabinet 6 made of aluminum or other sheet metal and flanged as at 7 to receive fastening screws 8 by which it is securely retained in operative position.

The cabinet casing or body 6 is provided with a hinged cover 9 and the latter with a spring latch 10, for retaining the cover normally closed. At its lowermost or inner extremity the casing 6 is equipped with a sliding drawer 11, preferably of rectangular form, closed on all sides with exception of its top or upper side, where it is crossed by a series of transverse bars 12, but is otherwise open to the interior of the cabinet. This drawer 11 is normally held in the closed position shown, by means of a spring 13, and is designed to receive a moistened sponge 14 thus serving as a humidor.

Within the cabinet casing 6 is affixed a transverse shelf 15, through which projects inwardly a series of individual tubular pockets or cigar holders 16, each perforated as at 17, and terminating in close proximity to bars 12 immediately over the humidor drawer 11 and its within contained sponge or other moistening device 14. These individual tubular holders 16 are flanged as at 18 on their upper ends and by means of said flanges are secured rigidly in the position shown.

In like manner at an intermediate position, there is secured another pocket or receptacle 19 depending from the same shelf 15, but of rectangular form to loosely and removably receive an ordinary cardboard carton from which cigarettes are usually dispensed.

Adjacent and immediately back of the said pocket 19, shelf 15 is flanged inwardly as at 20, to receive a readily removable tubular ash-tray 21, having a closed bottom and a flaring upper end 22, the latter to limit its downward movement and to facilitate the introduction of cigar ashes. At one side of its upper enlarged edge 22 this tray 21 is provided with a bifurcated spring 23, arranged and adapted to compactly fold over the receiver when not in use as shown by Figure 2, and adapted also to be unfolded in the opposite direction, to a position at right angles to the longitudinal axis of the receiver. When in the position last mentioned, the spring 23 forms a convenient means of passing the receiver to others, and also is utilized to secure the same in operative position, at some convenient point outside of the cabinet while in actual use, as for example by clipping said spring around the steering post of the automobile.

Pocketed as at 24, in the partition 15 aforesaid, there is provided an electric cigar-lighter of any approved form of construction, diagrammatically shown at 25. This lighter is directly connected with a source of electricity (not shown) and as usual in such lighters, is carried by a recoil extension cord which provides for its removal from the supporting pocket 24 when occasion requires.

Adjacent the lighter pocket 24 there is mounted in and above the partition 15 an ordinary electric incandescent lamp 26, also directly connected with a suitable source of electricity, such as a battery or magneto (not shown) by means of binding posts 27, 28. One of said posts 27 is provided with a cut-out switch normally open, comprising two leaf springs 29 and 30 normally insulated from each other, but adapted to contact at their outer ends when the spring 29 is unrestrained. This spring 29 is engaged by a reciprocating push-rod 31, interposed between it and the hinged cabinet cover 9, but obviously when the said cover 9 is opened the tension of spring 29 exerts itself until contact is made with its co-acting spring 30, the electric circuit is thereby completed, and the interior of cabinet 6 is illuminated so long as the cover 9 remains open.

Having thus set forth the structural arrangement of my invention in its preferred form of construction, its use and operation are quite obvious, and a further detailed description thereof would seem to be unnecessary.

What I therefore claim and desire to secure by Letters Patent is:

1. A smoker's cabinet for automobiles including an enclosing casing, a transverse partition in said casing, dividing the interior of the latter into two compartments, said partition being provided with apertures, a series of pockets extending through said apertures and adapted to receive cigars and smoker's materials, said pockets sealing said apertures in order to maintain one of said compartments substantially air-tight, the interiors of certain of said pockets being in communication with the interior of the substantially air-tight compartment, and a humidor arranged in the substantially air-tight compartment.

2. A smoker's cabinet for automobiles including an enclosing casing, a transverse partition in said casing provided with a series of apertures, a series of pockets extending through said partition, each pocket having a flange engaging one surface of the partition, said partition dividing the interior of the casing into upper and lower compartments, a closure for the upper compartment, and a humidor located within the lower compartment.

3. A smoker's cabinet for automobiles including an enclosing casing having a removable cover, the top wall of said casing being of greater length than the bottom wall of the same and the front edge portions of the side walls being inclined, the front edge portions of the top, bottom and side walls being provided with an outwardly extending flange to permit attachment of the casing to an instrument board or the like, a partition extending across the interior of said casing and arranged at an angle to the vertical and horizontal, and a series of pockets carried by said partition and adapted to receive cigars and smoking materials.

4. A smoker's cabinet for automobiles comprising in combination an enclosing casing having a removable cover, a transverse partition in said casing, a series of perforated tubular cigar receptacles and an ash-receiver depending from said partition and a humidor beneath said receptacles.

5. A smoker's cabinet comprising in combination a casing extending through the instrument board of an automobile, a hinged cover for said casing, a transverse partition within said casing, a series of cigar receptacles fixed in said partition, an ash-receiver removably mounted in said partition, and a humidor located within the cabinet.

6. A smoker's cabinet comprising in combination a casing extending through the instrument board of an automobile, a cover hinged to the upper end of said casing, a humidor drawer slidably mounted in the lower portion of said casing, a transverse partition intermediate said cover and drawer, and a series of pockets in said partition for the reception of smoking materials.

In testimony whereof I affix my signature, in presence of two subscribing witnesses.

ROBERT J. WARD.

Witnesses:
 THOMAS PETTUS BUANCH,
 JOHN HERMAN SVOUM.